Dec. 15, 1931.  F. BARNEY  1,836,104
BRAKE AND CLUTCH MECHANISM
Filed Jan. 3, 1928    2 Sheets-Sheet 1

Inventor
Freeman Barney
By
Liverance & Van Antwerp
Attorneys

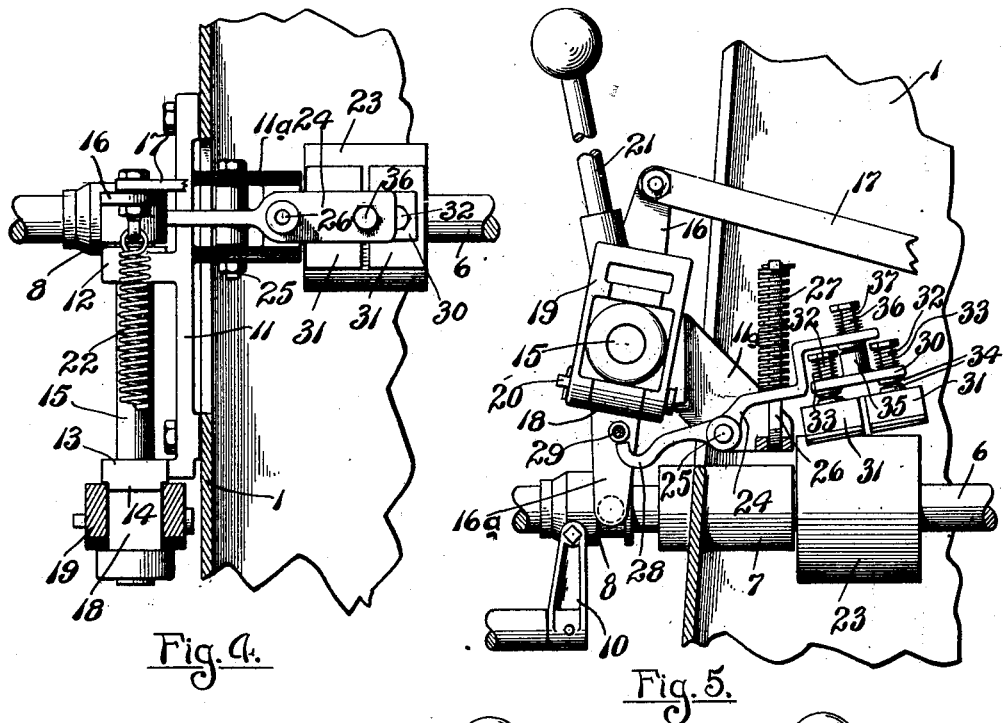
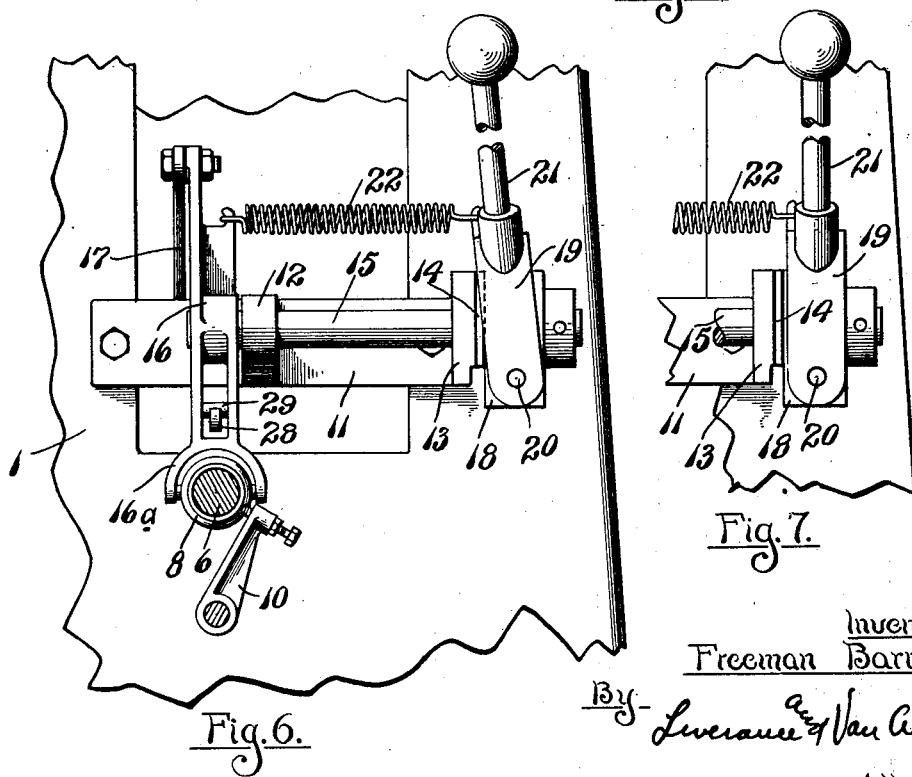

Patented Dec. 15, 1931

1,836,104

UNITED STATES PATENT OFFICE

FREEMAN BARNEY, OF GRAND HAVEN, MICHIGAN, ASSIGNOR TO CHALLENGE MACHINERY COMPANY, OF GRAND HAVEN, MICHIGAN, A CORPORATION OF MICHIGAN

BRAKE AND CLUTCH MECHANISM

Application filed January 3, 1928. Serial No. 244,136.

This invention relates to a brake and clutch mechanism which is particularly desirable for use with paper cutting machines though not limited in any sense thereto. The present invention is concerned with a safety arrangement and device used in conjunction with a clutch operating mechanism whereby when the clutch has been disengaged it cannot be again brought into engagement to operate the machine until it has been determined that a further operation of the machine shall be had which is accomplished by a manual operation of the mechanism to reengage the clutch. A further object of the invention is to combine with the clutch operating means a brake in such manner that the brake is automatically lifted and disengaged when the machine is to be operate and is automatically set and reengaged when the clutch is disengaged to thereby stop the machine from moving under its own momentum.

The invention consists of many novel details of construction and arrangement of parts and combinations for practically and effectively attaining the ends stated, as well as many others not at this time specifically enumerated, but which will appear as understanding of the invention is had from the following description taken in connection with the accompanying drawings, in which, Fig. 1 is a elevation of a paper cutting machine having my invention applied thereto, certain parts being broken away and in section to better disclose the construction.

Fig. 4 is a fragmentary horizontal section and plan of the clutch operating mechanism forming one part of my invention.

Fig. 5 is a fragmentary vertical section and side view of said clutch operating and brake mechanism.

Fig. 6 is a fragmentary elevation looking at the clutch operating mechanism from the left of Fig. 1 and showing the same locked against operation, and Fig. 7 is a fragmentary view similar to that shown in Fig. 6 showing the clutch operating mechanism unlocked as it is when the clutch is in operatively engaged position.

Like reference characters refer to like parts in the different figures of the drawings.

Figures 1, 2, 3:
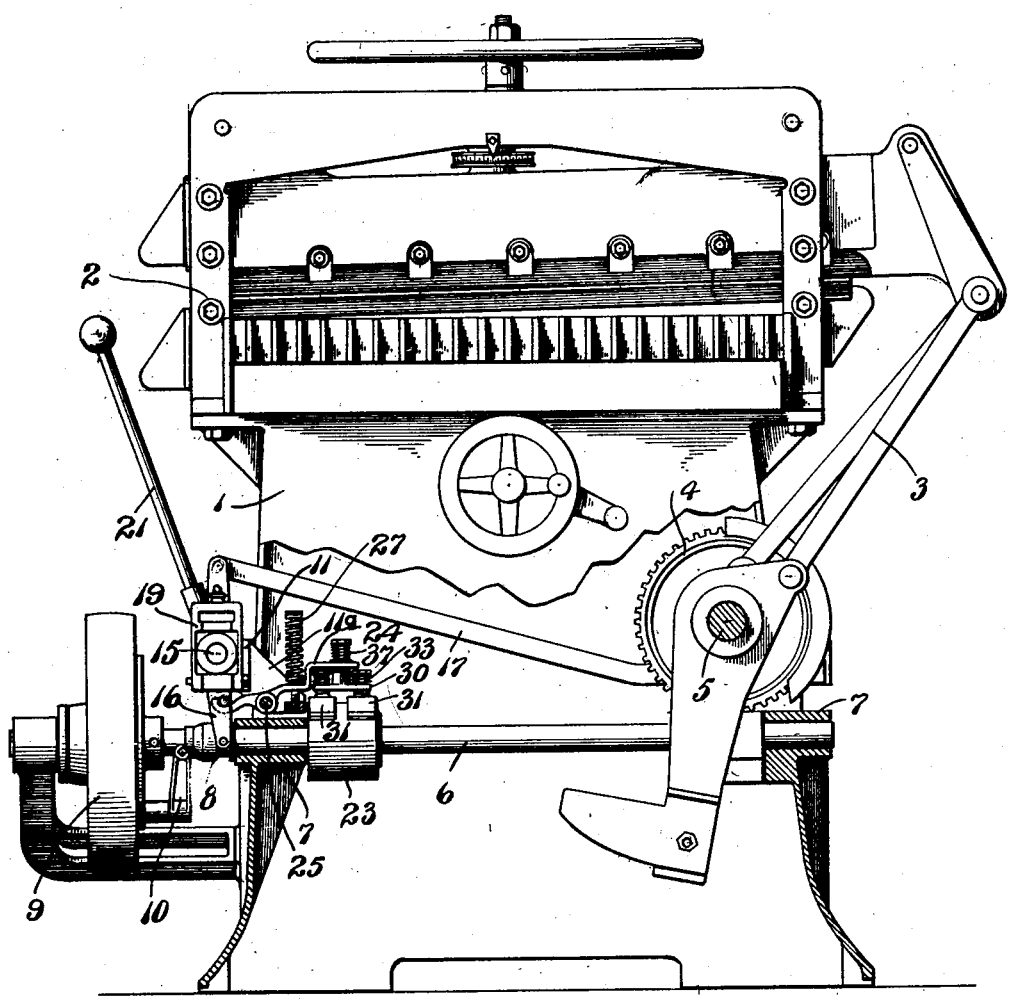
Fig. 2 is a fragmentary section and side elevation of the brake construction, showing the same when the brake is applied to the brake drum.
Fig. 3 is a fragmentary section and end elevation, the plane of the section being taken at right angles to that shown in Fig. 2.

At the upper end of the pedestal or frame 1 a paper cutting mechanism is mounted, indicated as a whole at 2, which is adapted to be operated through links 3 connected therewith and with a gear 4 mounted upon shaft 5.

The mechanism of the paper cutter and the specific operating means forms no part of the present invention and it is not shown in detail nor will it be described.

The mechanism is driven from a shaft 6 mounted in bearings 7 on the pedestal, as shown in Fig. 1. Toward one end of the shaft 6 and beyond the side of the pedestal 1 a collar 8 is mounted slidable on the shaft having a tapered end portion extending toward a drive wheel 9 which is loosely mounted on the shaft and which may be normally driven from any suitable source of power. On sliding the collar 8 on the shaft its tapered surface bears against an arm 10 rocking the same and in this manner operating a clutch fixed to the shaft 6 so that it connects with the drive wheel 9. The details of the clutch construction are not important but it is enough to say that when the clutch is engaged with the drive wheel 9 the shaft 6 will be driven and in this manner the machine operated.

The pedestal 1 above the bearing at 7 for the shaft 6 is cut away leaving an open side against which a bracket is placed and securely bolted to the pedestal. This bracket includes a horizontal bar 11 from which two spaced apart arms 11a extend downwardly and inwardly through the opening in the side of the pedestal. At the outer side of the bar 11 two spaced apart arms 12 and 13 extend outwardly. The arm 13 at its outer side is formed to have a projecting portion 14 best shown in Figs. 4 and 6 for a purpose which will later appear. The part 14 is as shown, being of less width than the width of the arm 13.

A rock shaft 15 is rotatably mounted through and extends between the bracket arms 12 and 13 and at each end extends beyond said arms. At one end directly above the shaft 6 a lever 16 is fixed to shaft 15 midway between the ends of the lever. The lower end of the lever 16 is formed with a yoke 16a engaged with the collar 8 while to the upper end of the lever a link bar 17 is pivotally connected at one end extending therefrom through the opening in the side of the pedestal 1 to the gear 4.

In machines of this character, at periodic intervals, that is, with each rotation of the gear 4 a throw-out mechanism is operated which serves to actuate the link 17 whereby the lever 16 is moved so as to withdraw the collar 8 and disengage the clutch thus automatically stopping the machine. This forms no part of the present invention being old and well known in devices of this character.

At the end of the rock shaft 15 opposite that to which lever 16 is attached, a rectangular block 18 is loosely mounted bearing against the part 14 of the bracket arm 13 and held thereagainst by a collar fastened to the end of the shaft. A stirrup 19 extends over the block 18 and is pivotally mounted thereto at the lower ends of the stirrup sides, as indicated at 20, so that it may have a rocking movement about the axis of the pivot. A handle 21 is connected to and extends upwardly and outwardly from the stirrup member 19. A coiled tension spring 22 is connected at one end to the member 19 and at the other to the lever 16, the tendency of the spring being to draw the stirrup member 19 to the right, in Fig. 6, so that the sides of the member 19 will come one against each side of the part 14 of arm 13. It is evident that when in such position as shown in Fig. 6 the shaft 16 cannot be rocked but is locked against rocking movement.

The stirrup 19 engages with the part 14 on disengagement of the clutch, holding and locking the clutch against reengagement. To reengage the clutch it is necessary to grasp the handle 21 turn it about the pivot 20 to disengage the stirrup from the part 14, and then rock the shaft 15 whereupon the collar 8 will be moved so as to make the clutch operative. When a predetermined operation of the machine has been accomplished, the throwout link 17 disengages the clutch by moving the lever 16 and locking the shaft 15 back to the position shown in Fig. 6. When it reaches such position the stirrup 19 immediately engages with the part 14 and locks the shaft 15 against rocking movement until said stirrup is again manually disengaged.

This construction insures that the mechanism will not be operated accidentally or in any other way except upon the predetermined manual engagement of the handle 21 with a movement of the same to extend the spring 22 to disengage the locking members, followed by a movement which consists of rocking the shaft 15. There is no likelihood of the handle 21 being operated through both of these movements accidentally and the safety arrangement provided is a practical insurance against accident.

A brake drum 23 is fixed on the shaft 6 at the inner end of the bearing 7 at the outer end of which the collar 8 is located. A lever 24 is pivotally mounted on a shaft 25 between the arms 11a extended inwardly from the bar 11, one end of the lever 24 being bent upwardly and then over the drum 23 and spaced a cosiderable distance therefrom, while the other end extends through the lower part of the lever 16 which has an opening for the passage of the same. A rod 26 passes through the lever 24 inside of the pivot shaft 25 and is threaded into a cross bar connecting the inner ends of the arms 11a. A compression spring 27 is located around the rod 26, bearing at its lower end against the upper side of the lever 24 and at its upper end bearing against the head formed on the upper end of the rod 26. This spring normally tends to move the inner end portion of the lever 24 toward the brake drum 23. The outer end of the lever 24 is shaped somewhat like a hook, as indicated at 28, to receive in the recess thereof at its upper side a roller 29 mounted on a pin extending between the sides of the lower part of the clutch operating lever 16. Roller 29 is received in said recess in one position of the lever 16 as shown in Figs. 1 and 6, but when the lever is moved to another position the roller rides upwardly out of the recess and bears against the end of the hook portion 28 thereby turning lever 24 on the pivot 25, compressing the spring 27 and lifting the brake shoes which are connected to the inner end of lever 24.

Underneath the inner end of the lever 24 and connected thereto is a member 30 below which and connected thereto are two brake shoes 31 which in lower operative position bear against the upper side of the brake drum 23. Headed pins 32 pass freely through the ends of the member 30 and thread into the brake shoes 31. These pins are normally elevated by compression springs 33 around the same between their heads and the member 30. The upper sides of the brake shoes 31 and the lower side of the member 30 are equipped with bosses 34 somewhat rounded at their engaging ends so that each brake shoe has a limited universal movement with respect to the member 30. The member 30 has a boss 35 extending upwardly therefrom into which the lower head of a headed pin 36, passing loosely through the inner end of the lever 24, is threaded. A compression spring 37 is located between the head of the pin 36 and the upper side of the lever 24. The upper end of the boss 35 and the adjacent lower side of the lever 34 also have rounded or convex surfaces in contact whereby the member 30 likewise has a limited universal movement with respect to the lever 24.

It is evident that brake shoes 31 come against the brake drum 23 whenever the clutch operating with the drive wheel 9 is disengaged, whereupon the pressure of the spring 27 is brought to bear through the brake shoes 31 against the drum 23 quickly stopping the mechanism from further operation. It is also evident that whenever the mechanism is operated so as to connect the shaft 6 with the drive wheel 9, the brake is lifted to the position shown in Fig. 5 so that the mechanism may run free from any braking. The construction of brake described is very desirable as it permits the brake shoes to conform themselves with the surfaces of the brake drum and not engage thereagainst only certain points or spots.

This construction has proven very satisfactory in service. The safety lock arrangement for the clutch operating mechanism is simple and practical and absolutely sure in its operation. The invention is defined in the appended claims and is to be considered comprehensive of all forms of structure coming within the scope of said claims.

I claim:

1. In combination, a driven shaft, power means for driving said shaft, a releasable clutch interposed between said shaft and the power means, a rock shaft, means interposed between said rock shaft and said clutch for releasing the clutch on rocking the shaft in one direction, a forked lever pivotally mounted on said rock shaft, a member of predetermined width over which said forked lever may engage when the rock shaft is moved to a position to release the clutch thereby locking the clutch against reengagement until the lever is disengaged from said member, and spring means normally drawing said lever toward said member.

2. In combination, a driven shaft, power means for driving the same, a releasable clutch interposed between said shaft and the power means, a rock shaft, means connected to the rock shaft and interposed between the shaft and said clutch for releasing the clutch on rocking the shaft in one direction, a support for the rock shaft having a member projecting therefrom of a predetermined width, a block mounted on said rock shaft bearing against said member, a fork embracing said block and pivotally mounted thereon to rock toward or away from said member, the sides of said fork passing by opposite sides of said member when the rock shaft is rocked to release the clutch, and spring means drawing said fork toward said member.

3. In combination, a driven shaft, power means for driving the same, a releasable clutch interposed between said driven shaft and power means, a brake drum on said driven shaft, a manually operable rock shaft, means interposed between said rock shaft and clutch for releasing the clutch on rocking the shaft in one direction and reengaging the clutch on rocking the same in the opposite direction, a pivotally mounted brake lever, a brake carried at one end of the lever over said brake drum, means carried by the means interposed between the rock shaft and said clutch for freeing the brake to engage with the brake drum on release of the clutch and for elevating the brake above said brake drum on reengagement of the clutch, and spring means tending to force said brake into braking engagement with said brake drum.

4. In combination, a driven shaft, a brake drum thereon, means for driving said shaft, a clutch disposed between the driven shaft and its driving means, release means for said clutch, a pivot shaft transverse to the driven shaft, a lever mounted on the transverse pivot shaft, a brake shoe, means to yieldably mount the shoe on the lever whereby it may be snugly engaged against the said brake drum, and supplemental means on the release means adapted to rock the lever to inoperative position when the clutch is moved to operative position.

5. In combination, a driven shaft, a brake drum thereon, means for driving said shaft, a clutch disposed between the driven shaft and its driving means, release means for said clutch, a pivot shaft transverse to the driven shaft, a lever mounted on the transverse pivot shaft, said lever extending over the brake drum, a member located against the under side of the lever between it and the brake drum and mounted on said lever for oscillating movement about a vertical axis, and a plurality of brake shoes mounted on said member for oscillating movement about vertical axes, and supplemental means on the release means adapted to rock the lever to inoperative position when the clutch is moved to operative position.

In testimony whereof I affix my signature.

FREEMAN BARNEY.